(12) United States Patent
Yamada et al.

(10) Patent No.: US 11,199,268 B2
(45) Date of Patent: Dec. 14, 2021

(54) FLUID CONTROL VALVE

(71) Applicant: CKD CORPORATION, Komaki (JP)

(72) Inventors: Kyomi Yamada, Komaki (JP); Tatsushi Nabei, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 17/099,336

(22) Filed: Nov. 16, 2020

(65) Prior Publication Data

US 2021/0156483 A1 May 27, 2021

(30) Foreign Application Priority Data

Nov. 21, 2019 (JP) .............................. JP2019-210288
Nov. 12, 2020 (JP) .............................. JP2020-188673

(51) Int. Cl.
  *F16K 1/42* (2006.01)
  *F16K 7/16* (2006.01)
  *F16K 31/06* (2006.01)
  *F16K 1/36* (2006.01)
  *F16K 1/54* (2006.01)
  (Continued)

(52) U.S. Cl.
  CPC .................. *F16K 1/42* (2013.01); *F16K 1/36* (2013.01); *F16K 1/46* (2013.01); *F16K 1/54* (2013.01); *F16K 7/16* (2013.01); *F16K 17/02* (2013.01); *F16K 25/02* (2013.01); *F16K 27/02* (2013.01); *F16K 31/1266* (2013.01); *G05D 7/0635* (2013.01); *F16K 17/30* (2013.01);
  (Continued)

(58) Field of Classification Search
  CPC ..... F16K 1/36; F16K 1/42; F16K 1/54; F16K 7/16; F16K 31/0655; F16K 1/46; F16K 31/1266; F16K 31/12; F16K 41/103; F16K 17/30; F16K 17/02; F16K 27/02; F16K 25/02; G05D 7/0635
  See application file for complete search history.

(56) References Cited

U.S. PATENT DOCUMENTS 3,410,524 A * 11/1968 Self .......................... F16K 1/42
                                                       251/332
4,280,680 A *  7/1981 Payne ...................... F16K 1/34
                                                       251/120
(Continued)

FOREIGN PATENT DOCUMENTS

JP    2009-230259 A    10/2009
WO   WO-2018172705 A1 *  9/2018 ............... F16K 1/36

*Primary Examiner* — Jessica Cahill
*Assistant Examiner* — Patrick C Williams
(74) *Attorney, Agent, or Firm* — Oliff PLC

(57) ABSTRACT

A regulator performing fluid control includes an annular protruding portion having a valve seat on its leading end and an annular diameter-decreasing surface formed by decreasing an inner diameter of the annular protruding portion toward a valve hole. The regulator includes a valve element provided with a contact surface to be in contact with the valve seat and a columnar step portion provided on an inner peripheral side of the valve seat protruding from the contact surface toward the valve hole, the step portion having a diameter larger than an inner diameter of the valve hole and being coaxially formed with the valve hole. An annular ridge is formed by an outer peripheral surface of the step portion intersecting an end face of the step portion on the valve-hole side with the annular diameter-decreasing surface to constitute a passage narrowing portion.

9 Claims, 16 Drawing Sheets

(51) Int. Cl.
    *G05D 7/06*      (2006.01)
    *F16K 31/126*    (2006.01)
    *F16K 31/12*     (2006.01)
    *F16K 41/10*     (2006.01)
    *F16K 17/30*     (2006.01)
    *F16K 27/02*     (2006.01)
    *F16K 17/02*     (2006.01)
    *F16K 1/46*      (2006.01)
    *F16K 25/02*     (2006.01)

(52) U.S. Cl.
    CPC .......... *F16K 31/0655* (2013.01); *F16K 31/12* (2013.01); *F16K 41/103* (2013.01)

(56) References Cited

U.S. PATENT DOCUMENTS

| | | | | |
|---|---|---|---|---|
| 4,487,222 | A * | 12/1984 | Crawford | F16K 1/38 |
| | | | | 137/516.29 |
| 5,826,336 | A * | 10/1998 | Schmitz | F16K 25/00 |
| | | | | 29/890.124 |
| 6,039,071 | A * | 3/2000 | Tomita | F16K 1/42 |
| | | | | 137/505.37 |
| 9,388,773 | B2 * | 7/2016 | Nakamura | F16K 1/36 |
| 2003/0098074 | A1 * | 5/2003 | Kayahara | F16K 31/0693 |
| | | | | 137/557 |
| 2006/0197049 | A1 * | 9/2006 | Hamada | F16K 31/1225 |
| | | | | 251/285 |
| 2009/0235993 | A1 | 9/2009 | Sugata et al. | |
| 2014/0034155 | A1 * | 2/2014 | Askew | G05D 16/0666 |
| | | | | 137/505 |
| 2016/0018007 | A1 * | 1/2016 | Eckholz | F16K 47/04 |
| | | | | 251/318 |

* cited by examiner

FLUID CONTROL VALVE

CROSS-REFERENCE TO RELATED APPLICATIONS

This application is based upon and claims the benefit of priority from the prior Japanese Patent Applications No. 2019-210288, filed Nov. 21, 2019, and No. 2020-188673 filed on Nov. 12, 2020, the entire contents of which are incorporated herein by reference.

BACKGROUND

Technical Field

The present disclosure relates to a fluid control valve provided with a valve element, a valve chamber provided on an upstream side for accommodating the valve element, a valve hole provided on a downstream side and communicated with the valve chamber, and an annular protruding portion protruding from an inner surface of the valve chamber on a side of the valve hole along an outer periphery thereof, the annular protruding portion including a valve seat on its leading end. The fluid control valve is configured to perform fluid control by bringing the valve element into and out of contact with the valve seat.

Related Art

As a fluid control valve of performing fluid control by bringing the valve element into and out of contact with the valve seat, a flow rate control device described in JP2009-230259A and a regulator 50 shown in FIG. 4 are considered, for example. The regulator 50 is to perform pressure control of a control fluid such as pure water and chemical liquid which are used for a semiconductor manufacturing process. The regulator 50 includes a passage communicating an input port 511, a valve chamber 513, a downstream-side fluid chamber 516a, and an output port 512 and performs the pressure control of the control fluid that is input from the input port 511 and output from the output port 512 in a manner that a contact surface 54a of a valve element 54 connected with a diaphragm member 55 is brought into and out of contact with a valve seat 515 by operation air that is introduced into a pressure applying chamber 516b inside a valve body 51.

SUMMARY

Technical Problems

However, the above-mentioned conventional technique has the following problems. Specifically, when a difference in a control fluid pressure between an input side and an output side is large about 200 kPa, for example, a distance (i.e., a valve open degree) between the contact surface 54a and the valve seat 515 which are separated from each other is small like 0.035 mm, and the control fluid passing through such a small clearance has high flow velocity. This increase in the flow velocity causes decrease in the pressure of the control fluid (according to the Bernoulli's principle) and the pressure falls in a negative-pressure region on a downstream side of the valve seat 515. This leads to occurrence of foaming phenomena (cavitation) due to boil of the control fluid. The foam formed by the cavitation then collapses and this collapse of the foam generates an impulsive wave to bring about oscillation in the regulator 50. Further, the control fluid evaporated by the cavitation increases in its volume, but the increased volume returns to its original volume by the collapse of the foam. This increase and decrease in the volume of the control fluid leads to pressure oscillation in the downstream-side fluid chamber 516a. The oscillation and pressure oscillation by the impulsive wave are further transmitted to a pipe connected with the regulator 50, which could result in noises.

Further, when the control fluid passes through the clearance with the valve open degree of about 0.035 mm between the contact surface 54a and the valve seat 515, the flow velocity of the control fluid increases to cause a jet stream on the downstream side of the valve seat 515. This jet stream flows along the contact surface 54a, and thus there is a possibility of oscillating the valve element 54. This oscillation is transmitted to the pipe connected with the regulator 50, which could result in the noises.

In recent years, size reduction and high densification of a semiconductor manufacturing apparatus has demanded size reduction in a fluid control valve. In the conventional regulator 50, even when the oscillation due to the cavitation and the jet stream has occurred, the oscillation seems to have been absorbed by the diaphragm member 55 connected to the valve element 54. However, size reduction in the apparatus leads to reduction in a diameter of the diaphragm member 55 compared to the conventional apparatus and also leads to reduction in a capacity of the downstream-side fluid chamber 516a and a capacity of the pressure applying chamber 516b, so that it has become difficult to absorb the oscillation due to the cavitation, and therefore it is considered that the oscillation tends to occur easily.

The present disclosure has been made in view of the above circumstance, and has a purpose of providing a fluid control valve achieving prevention or suppression of oscillation that is caused by flow of a control fluid.

Means of Solving the Problems

To solve the above problem, a fluid control valve according to the present disclosure has the following configuration.

A fluid control valve according to the present disclosure is a fluid control valve comprising: a valve element; a valve chamber on an upstream side accommodating the valve element; a valve hole on a downstream side communicated with the valve chamber; and an annular protruding portion protruding from an inner surface of the valve chamber on a side of the valve hole along an outer periphery of the valve hole, the annular protruding portion having a leading end provided with a valve seat, the fluid control valve being configured to perform fluid control by bringing the valve element into and out of contact with the valve seat, wherein the annular protruding portion is provided on its entire circumference on an inner diameter side with an annular diameter-decreasing surface decreasing an inner diameter of the annular protruding portion toward the valve hole, the valve element includes a contact surface to be in contact with the valve seat and a columnar step portion provided coaxially with the valve hole with a large diameter larger than an inner diameter of the valve hole, the step portion protruding from the contact surface toward the valve hole on an inner peripheral side of the valve seat, and an annular ridge formed by intersecting an outer peripheral surface of the step portion with an end face of the step portion on a side of the valve hole is placed in a vicinity of the annular diameter-decreasing surface to form a passage narrowing portion.

According to the above fluid control valve, a fluid flowing from the valve chamber to the valve hole passes through a portion narrowed its passage area by the valve element and the valve seat, a portion widened its passage area by a space surrounded by the annular diameter-decreasing surface, the contact surface, and an outer peripheral surface of the step portion, and a portion narrowed its passage area by the passage narrowing portion in this order. Thus, the applicant has confirmed from experiments that a negative pressure state on the downstream side of the valve seat is relaxed according to the above configuration.

Relaxation of the negative pressure state can suppress generation of the cavitation, and even if the cavitation occurs, a term from generation to disappearance of the foam can be shortened. Accordingly, it is possible to suppress generation of the oscillation caused by the cavitation, thereby suppressing noises caused by the oscillation.

Further, the step portion protruding from the contact surface toward the valve hole guides the jet stream toward the valve hole, so that the jet stream is separated away from the valve element. This can achieve suppression of the oscillation in the valve element caused by the jet stream, thereby achieving suppression of the noises.

According to the fluid control valve of the present disclosure, it is possible to prevent or suppress the oscillation caused by flow of the control fluid.

DETAILED DESCRIPTION OF THE EXEMPLARY EMBODIMENTS

An embodiment of a fluid control valve according to the present disclosure is explained in detail with reference to the accompanying drawings.

Figure 1:
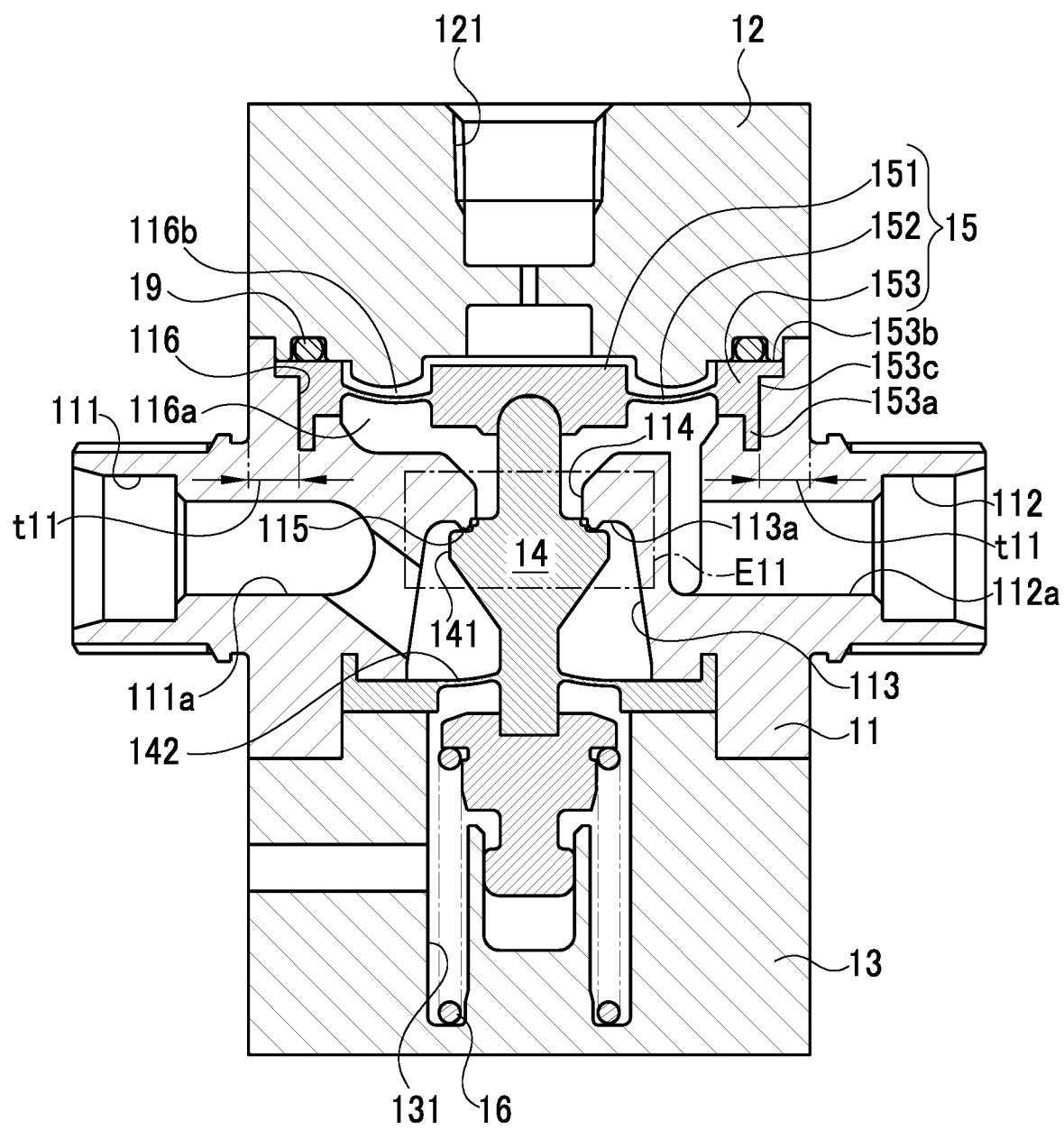
FIG. 1 is a sectional view of a regulator in a present embodiment.

A fluid control valve according to the present embodiment is exemplified as a regulator 1 performing pressure control of a control fluid such as chemical liquid and pure water which are used for a semiconductor manufacturing process. As shown in FIG. 1, the regulator 1 includes a valve body 11, an upper cover (one example of a cover member) 12, and a lower cover 13, and the upper cover 12 and the lower cover 13 are assembled to the valve body 11 in a direction parallel to a direction in which the valve element 14 is brought into and out of contact with the valve seat 115a (see FIG. 2). The valve body 11 is provided with an input port 111 to which the control fluid is input and an output port 112 through which the control fluid is output. The valve body 11 as a liquid-contact component is, for example, made of fluorocarbon-related synthetic resin with high corrosion resistance. The upper cover 12 and the lower cover 13, which are not the liquid-contact components, are made of polypropylene resin, for example.

On a center part of the valve body 11, a valve chamber 113 communicated with the input port 111 via an input passage 111a is provided in a drilled manner extending from an end face of the valve body 11 on a side of the lower cover 13 toward a side of the upper cover 12. Further, the valve chamber 113 is communicated with a valve hole 114 and has a valve-hole-side inner surface 113a provided with an annular protruding portion 115 protruding along an outer periphery of the valve hole 114.

Figure 2:
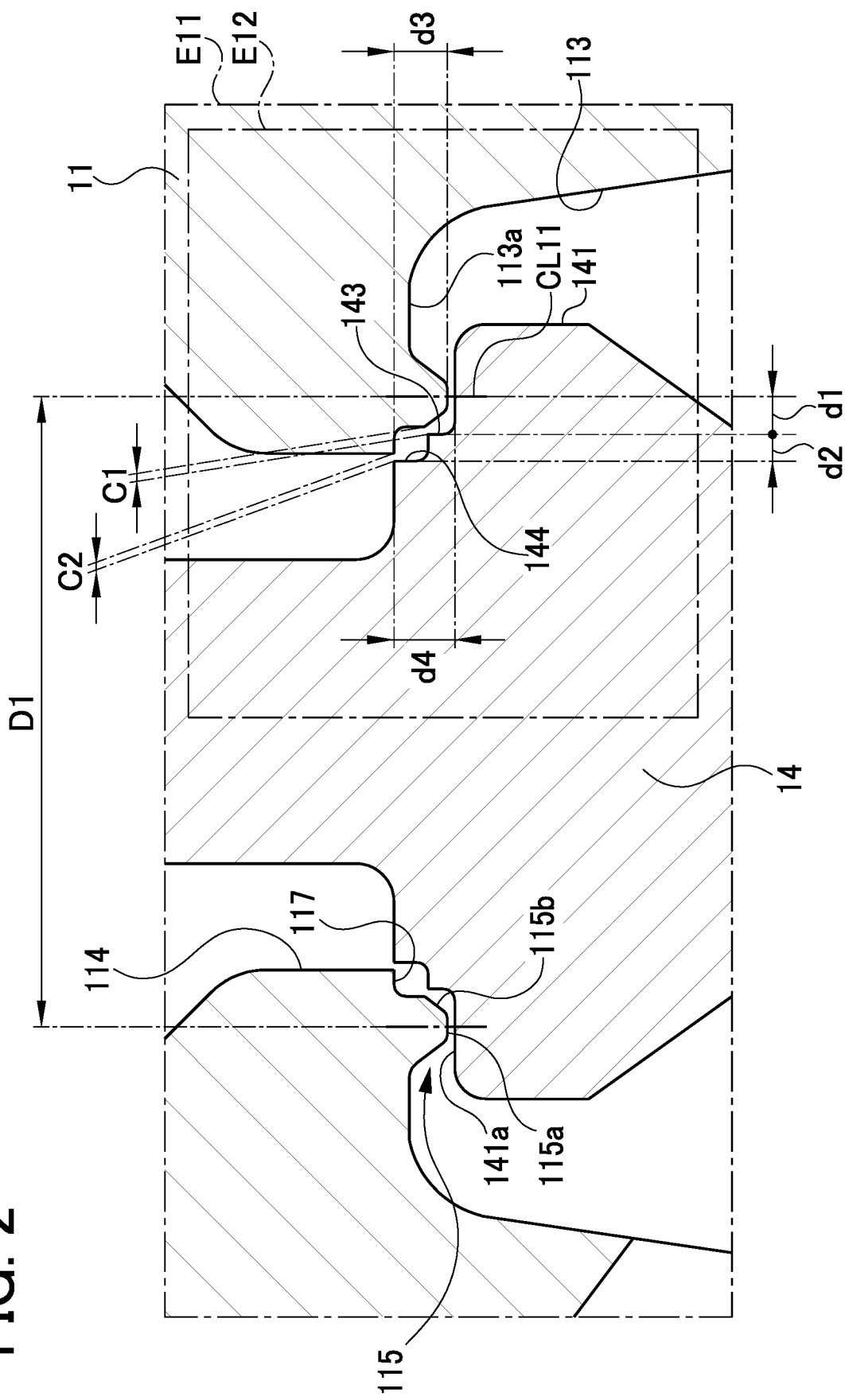
FIG. 2 is a partial enlarged view of a part E11 of FIG. 1.

A leading end of the annular protruding portion 115 is, as shown in FIG. 2, provided with the valve seat 115a to be brought into and out of contact with the valve element 14 which will be described below, and the annular protruding portion 115 is provided on its entire circumference on an inner diameter side with an annular diameter-decreasing surface 115b in which an inner diameter of the annular protruding portion 115 decreases toward the valve hole 114. The annular diameter-decreasing surface 115b and an inner peripheral surface of the valve hole 114 are connected by an annular recessed portion 117 which is provided coaxially with the valve hole 114 and provided in a drilled manner from the annular diameter-decreasing surface 115b toward the valve hole 114.

Further, the valve body 11 is provided with an opening portion 116 provided in a drilled manner to be communicated with the valve hole 114 on an end face on a side of the upper cover 12. The opening portion 116 is divided into a downstream-side fluid chamber 116a which is communicated with the output port 112 via the output passage 112a and a pressure applying chamber 116b by a diaphragm member 15 described below. Herein, a passage from the input port 111 to the output port 112 is constituted by the input passage 111a, the valve chamber 113, the valve hole 114, the downstream-side fluid chamber 116a, and the output passage 112a.

The valve chamber 113 accommodates the columnar valve element 14 which is reciprocally movable in a direction parallel to an assembly direction of the upper cover 12 and the lower cover 13. The valve element 14 is provided in its axial center part with a diameter-increased portion 141 having a large diameter larger than other portions. The diameter-increased portion 141 has an end face facing the valve seat 115a as a contact surface 141a to be contacted with the valve seat 115a as shown in FIG. 2. When the valve element 14 is moved toward the annular protruding portion 115, the contact surface 141a comes to contact with the valve seat 115a to shut off the passage from the input port 111 to the output port 112. On the other hand, when the valve element 14 is moved to an opposite side away from the annular protruding portion 115, the contact surface 141a is separated from the valve seat 115a to communicate the passage from the input port 111 to the output port 112.

Further, the contact surface 141a is provided with a columnar step portion 143 protruding toward the valve hole 114 provided on an inner periphery side of the valve seat 115a. The step portion 143 has a large diameter larger than an inner diameter of the valve hole 114 and is placed coaxially with the valve hole 114.

Figure 3:
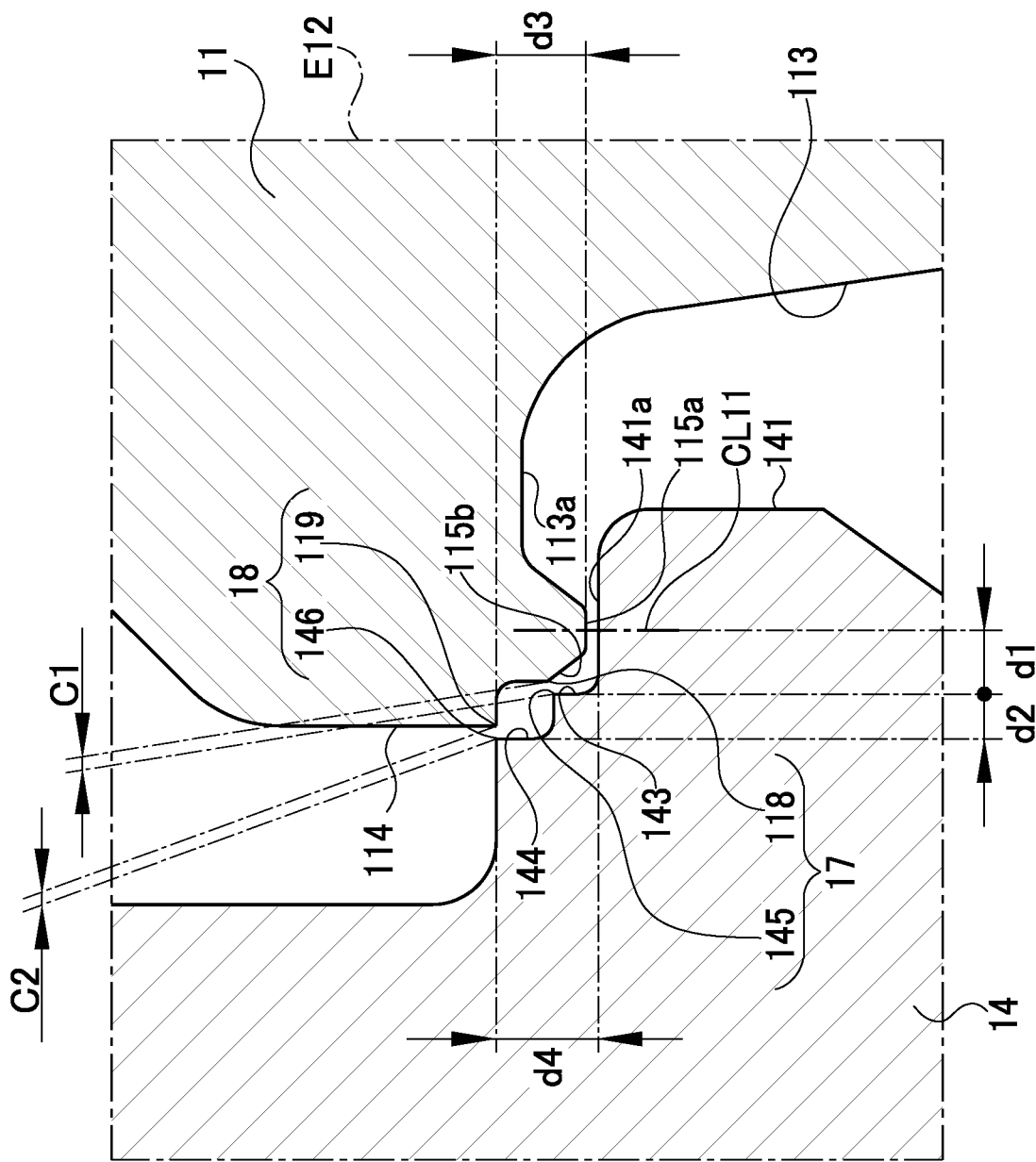
FIG. 3 is a partial enlarged view of a part E12 of FIG. 2.
Figure 4:
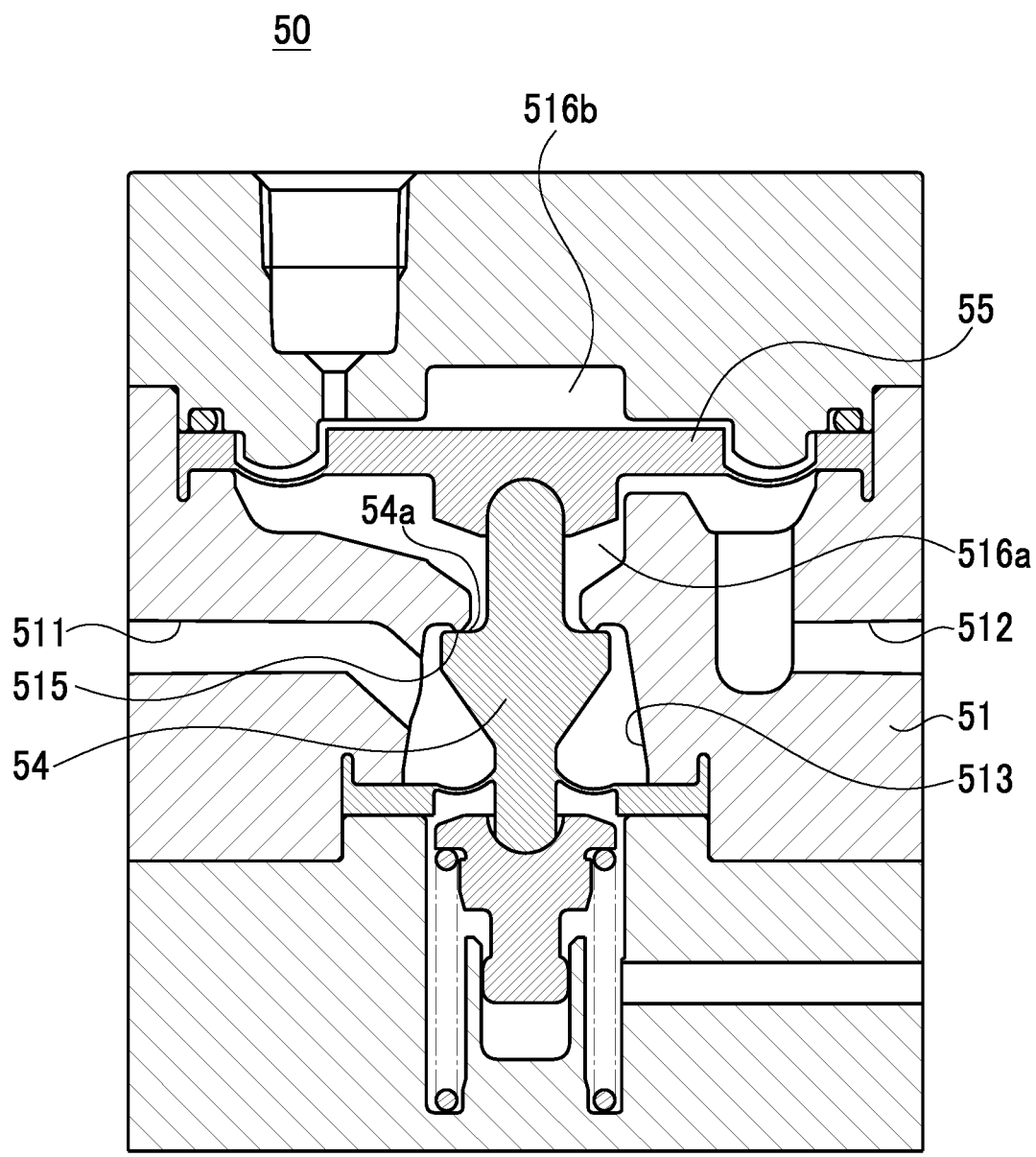
FIG. 4 is a sectional view of a regulator in a conventional art.

As shown in FIG. 3, in a vicinity of a first annular ridge 145 (one example of an annular ridge) formed by intersecting an outer peripheral surface of the step portion 143 with an end face (an upper end face) of the step portion 143 on the side of the valve hole 114, there is placed a third annular ridge 118 formed by intersecting an inner peripheral surface of the annular recessed portion 117 with the annular diameter-decreasing surface 115b. The first annular ridge 145 and the third annular ridge 118 constitute a passage narrowing portion 17. A sectional area of the passage which has been narrowed by the contact surface 141a and the valve seat 115a is once increased by a space (first space) surrounded by the contact surface 141a, the outer peripheral surface of the step portion 143, and the annular diameter-decreasing surface 115b, and then narrowed again by the passage narrowing portion 17.

Further, the upper end face of the step portion 143 is, as shown in FIG. 2, provided with a columnar second step portion 144 having a small diameter smaller than an outer diameter of the step portion 143 in a protruding manner protruding toward the valve hole 114. This second step portion 144 is placed coaxially with the valve hole 114.

As shown in FIG. 3, in a vicinity of a second annular ridge 146 formed by intersecting an outer peripheral surface of the second step portion 144 with an end face (an upper end face) of the second step portion 144 on the side of the valve hole 114, there is placed a fourth annular ridge 119 formed by intersecting an inner surface of the annular recessed portion 117 on the side of the valve hole 114 with the inner peripheral surface of the valve hole 114. The thus formed second annular ridge 146 and the fourth annular ridge 119 constitute a second passage narrowing portion 18. A sectional area of the passage which is narrowed by the passage narrowing portion 17 is increased in a space (a second space) surrounded by the upper end face of the step portion 143, the outer peripheral surface of the second step portion 144, and the annular recessed portion 117, and then narrowed again by the second passage narrowing portion 18.

A clearance dimension C1 of the passage narrowing portion 17 in a radial direction of the first annular ridge 145 is preferably set such that a value of multiplying the clearance dimension C1 by a diametric dimension D1 (see FIG. 2) in a center part (a center axis CL11) of the valve seat 115a of the annular protruding portion 115 is in a range from 0.6 to 1.2, and for example in the present embodiment, the thus multiplied value is set as 0.83.

Further, a clearance dimension C2 of the second passage narrowing portion 18 in a radial direction of the second annular ridge 146 is preferably set such that a value of multiplying the clearance dimension C2 by the diametric dimension D1 in the center part (the center axis CL11) of the valve seat 115a of the annular protruding portion 115 is in a range from 0.6 to 1.2, and for example in the present embodiment, the thus multiplied value is set as 0.83.

It is also preferable to set a distance d1 from the center part (the center axis CL11) of the valve seat 115a to the outer peripheral surface of the step portion 143 in a range from 0.4 mm to 0.8 mm, and for example in the present embodiment, the distance d1 is set as 0.5 mm. Further, it is preferable to set a distance d2 from the outer peripheral surface of the step portion 143 to the outer peripheral surface of the second step portion 144 is set in a range from 0.4 mm to 0.8 mm, and for example in the present embodiment, the distance d2 is set as 0.4 mm.

A distance d3 from the valve seat 115a to the inner surface of the annular recessed portion 117 on the side of the valve hole 114 is preferably shorter than a distance d4 from the contact surface 141a to an upper end face of the second step portion 144 by 0.03 mm to 0.13 mm, and for example in the present embodiment, the distance d3 is made shorter than distance d4 by 0.1 mm.

Further, as shown in FIG. 1, the valve element 14 is provided with a diaphragm part 142 formed integrally with the valve element 14 on its end portion on a side of the lower cover 13, and attached to the diaphragm member 15 including a diaphragm part 152 on an end portion on a side of the upper cover 12. The diaphragm part 142 of the valve element 14 and the diaphragm part 152 of the diaphragm member 15 are elastically deformed in association with movement of the valve element 14 being brought into and out of contact with the valve seat 115a. The valve element 14 and the diaphragm member 15 as liquid-contact components are made of, for example, fluorocarbon-related synthetic resin with high corrosion-resistance.

The diaphragm member 15 is provided with the diaphragm part 152 on an outer periphery of a center portion 151 to which the valve element 14 is attached and further provided with an annular fixing portion 153 along an outer periphery of the diaphragm part 152. The annular fixing portion 153 includes an annular cutout portion 153c formed by cutting out an entire outer periphery of the annular fixing portion 153 from the outer peripheral surface to an end face (a lower end face) of the diaphragm part 152 on a side of the valve body 11 except an end portion (an upper end face 153b) on a side of the upper cover 12. A press-fitting portion 153a is provided on a lower end face of the annular fixing portion 153 such that the press-fitting portion 153a is allowed to be press-fitted into the opening portion 116 of the valve body 11. The diaphragm member 15 press-fitted in the opening portion 116 is fixed by holding the annular fixing portion 153 with the upper cover 12 and the valve body 11 from both sides in a direction of bringing the valve element 14 into and out of contact with the valve seat 115a. There is placed an O-ring 19 between the upper end face 153b of the annular fixing portion 153 and the upper cover 12 to hermetically close the pressure applying chamber 116b.

The annular cutout portion 153c makes a thickness t11 of the valve body 11 thick by the cut-out part of the annular fixing portion 153 which is cut out by the annular cutout portion 153c, thereby increasing strength of the valve body 11. Further, the annular cutout portion 153c is formed to cut out the outer peripheral surface of the annular fixing portion 153 to the lower end face thereof other than the upper end face 153b, and thus an area to be pressed against the upper cover 12 can be assured in the upper end face 153b.

The lower cover 13 is provided with a spring accommodation chamber 131 on an opposite side from the valve chamber 113 via the diaphragm part 142. The spring accommodation chamber 131 accommodates a compression coil spring 16. The valve element 14 is constantly urged by an urging force of the compression coil spring 16 in a direction to be in contact with the valve seat 115a. Thus, the contact surface 141a of the valve element 14 remains to be contacted with the valve seat 115a.

The upper cover 12 is provided with an introduction port 121 communicated with the pressure applying chamber 116b, and the operation air is introduced into the pressure applying chamber 116b through this introduction port 121. A position of the valve element 14 is adjusted by controlling pressure of the operation air in the pressure applying chamber 116b.

It is now explained below about a manner of the control fluid flow in a vicinity of the contact surface 141a of the valve element 14 and the valve seat 115a of the regulator 1 having the above-mentioned configuration.

A conventional configuration which has a problem of cavitation is firstly explained in detail with reference to FIGS. 5 to 8.

Figure 5:
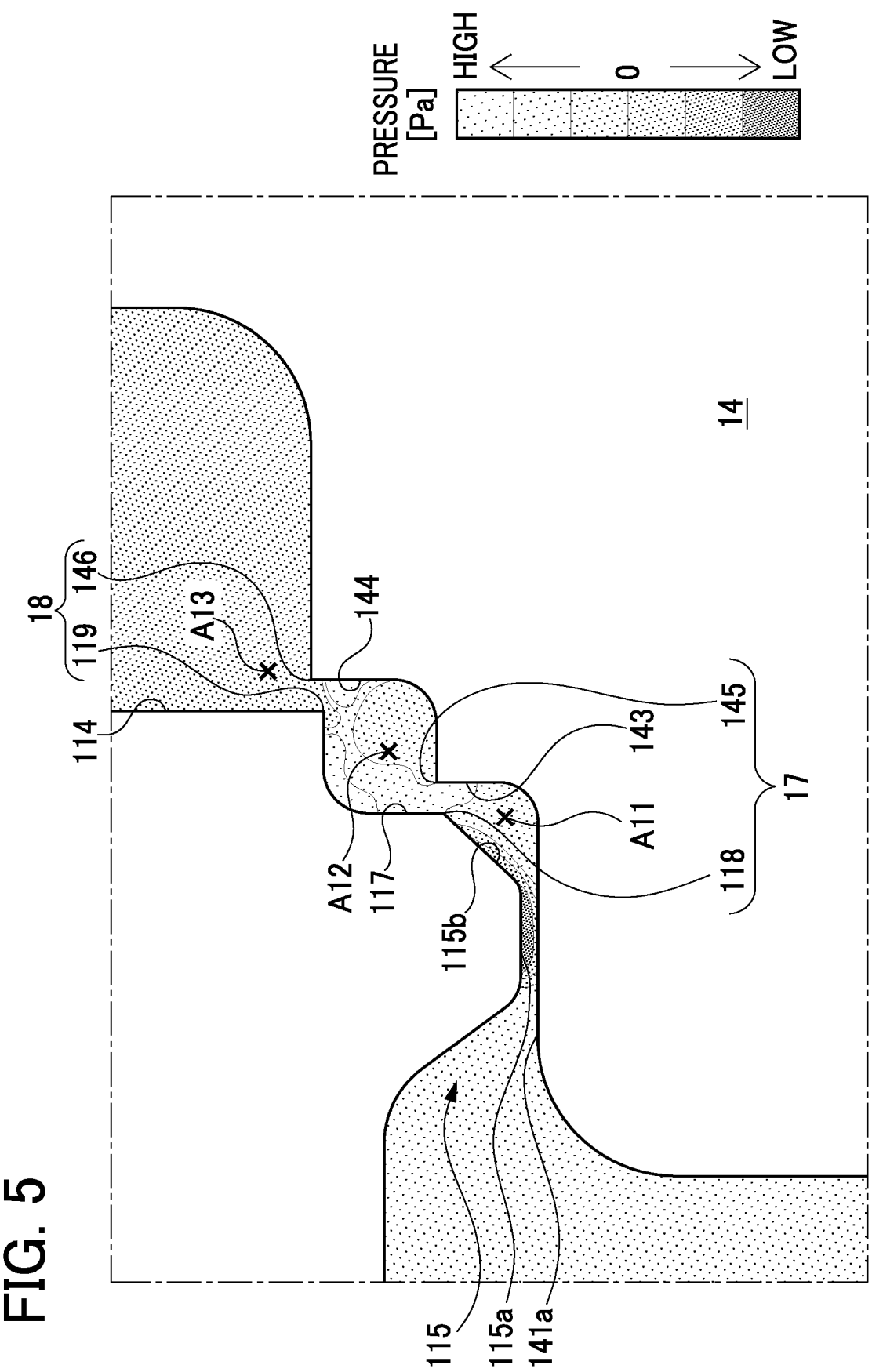
FIG. 5 is a pressure distribution diagram of a control fluid in the valve seat and its vicinity of the regulator in the present embodiment.
Figure 6:
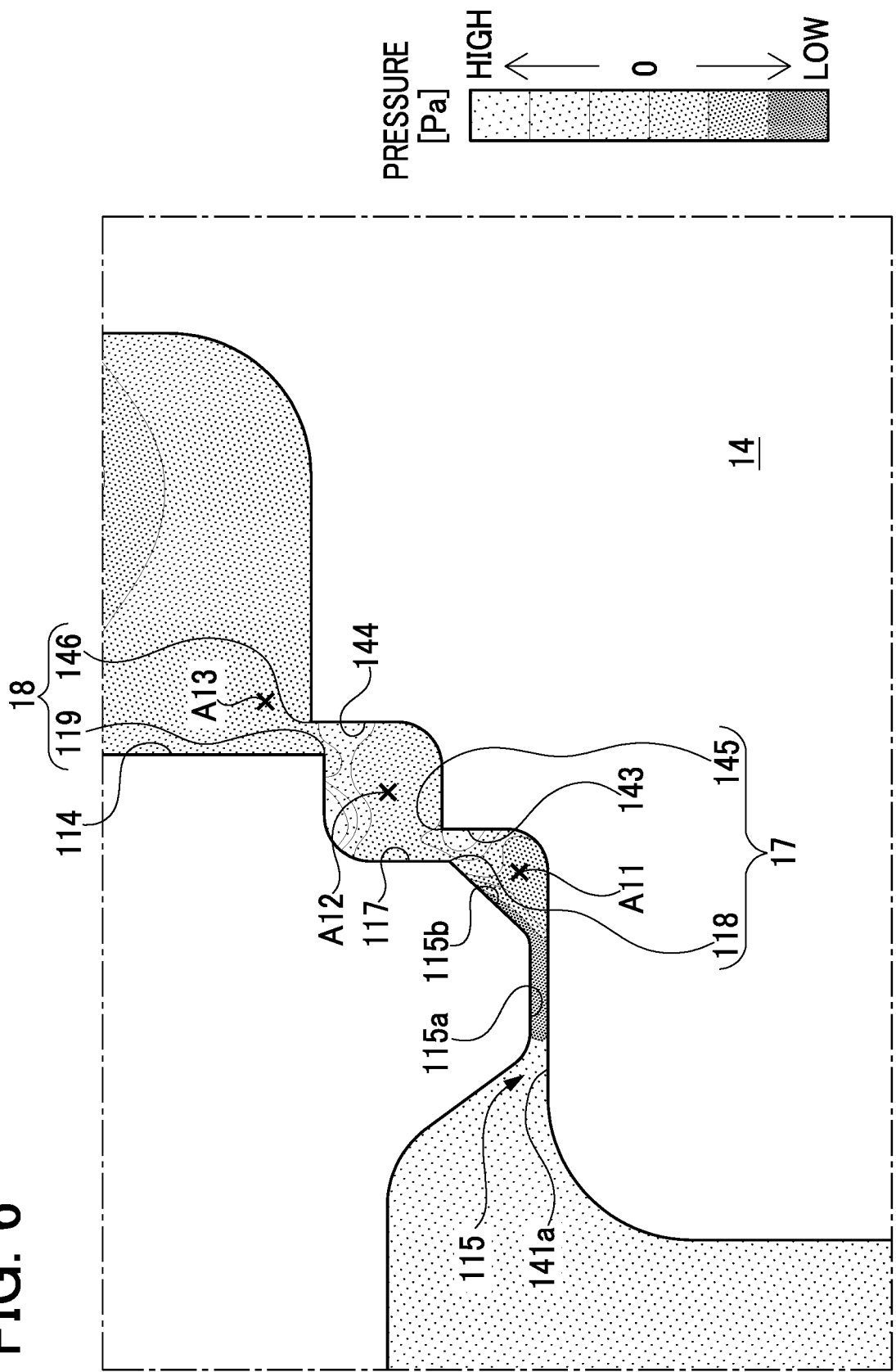
FIG. 6 is a pressure distribution diagram of the control fluid in the valve seat and its vicinity in a case when a clearance dimension of a second passage narrowing portion is increased.
Figure 7:
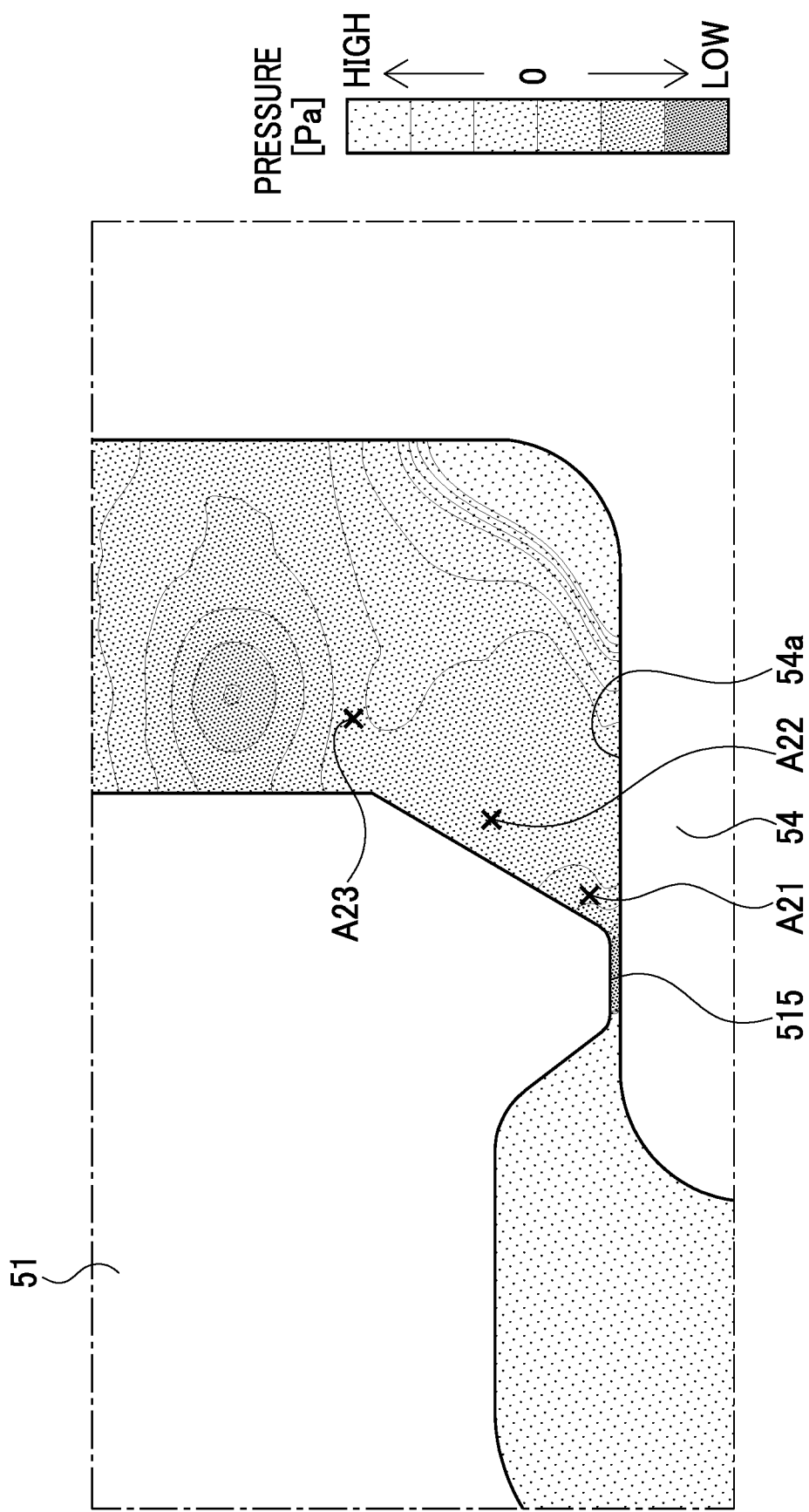
FIG. 7 is a pressure distribution diagram of the control fluid in the valve seat and its vicinity of the regulator in the conventional art.

FIG. 5 and FIG. 6 show pressure distribution maps each showing pressure distribution in the contact surface 141a, the valve seat 115a, and their vicinity in a case that a pressure difference of the control fluid between an input side and an output side of the regulator 1 is controlled to be about 200 kPa for example, so that a valve open degree is made to be about 0.035 mm. These pressure distribution maps show computational analytical results of pressure distribution by the Finite Element Method. FIG. 7 is a pressure distribution map showing pressure distribution in the contact surface 54a, the valve seat 515, and their vicinity in a case where the regulator 50 according to the conventional art has a valve open degree of about 0.035 mm. This pressure distribution map shows computational analytical results of the pressure distribution by the Finite Element Method. In FIGS. 5 to 7, a part represented by dots with high density indicates a low-pressure part, and a part represented by dots with low density indicates a high-pressure part.

Herein, when the pressure on a downstream side of the valve seat 115a is low, cavitation tends to easily occur, and for example, in a state in which the pressure declines to a pressure value P11 or less (see FIG. 8), for example, the cavitation tends to easily occur.

When the valve open degree is about 0.035 mm, the control fluid going through such small clearance has fast flow velocity. In a state where the flow velocity of the control fluid gets fast, the pressure of the control fluid on the downstream side of the valve seat 515 of the conventional regulator 50 is examined at three measurement points A21, A22, and A23 in the pressure distribution map as shown in FIG. 7, for example. Observation result shows that all the three points are under negative pressure state. This negative state is caused by pressure reduction due to increase in the flow velocity (the Bernoulli's principle). Further, pressure values on the measurement points A21, A22, and A23 are all less than or equal to the pressure value P11, thus it is confirmed that the cavitation easily occurs.

On the other hand, in the regulator 1 according to the present embodiment, as shown in FIG. 5, the valve element 14, the valve seat 115a, and their vicinity are under negative pressure state, but at a measurement point A11 in the first space in the pressure distribution map corresponding to a position of the measurement point A21, the negative pressure state is relieved and the pressure value turns positive. This is clear from a graph shown in FIG. 8.

Further, also at a measurement point A12 in the second space in the pressure distribution map corresponding to the measurement point A22, the negative pressure state is relieved and the pressure value turns positive. This is also clear from the graph in FIG. 8.

Figure 8:
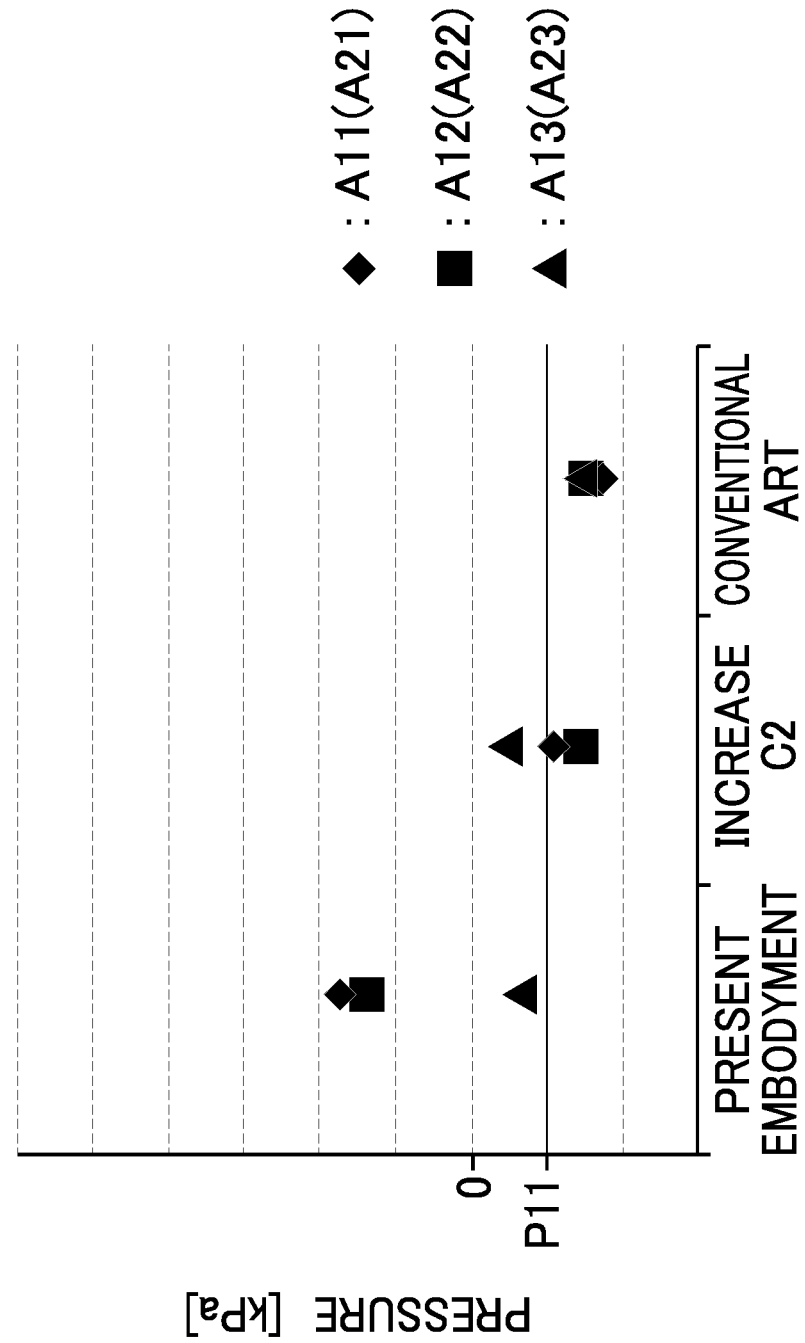
FIG. 8 is a graph for comparing pressure values of the control fluid in the valve seat and its vicinity.

At a measurement point A13 corresponding to the measurement point A23, the point is configured to be in the negative pressure state from the pressure distribution map, but the point is over the pressure value P11 as shown in the graph of FIG. 8, thus the state of generating the cavitation seems to be relieved.

Namely, in the regulator 1 of the present embodiment, all the measurement points A11, A12, and A13 indicate pressure more than or equal to the pressure value P11, so that the cavitation hardly occurs.

As mentioned above, the clearance dimension C1 of the passage narrowing portion 17 in the radial direction of the first annular ridge 145 is preferably set such that a value of multiplying the clearance dimension C1 by the diametric dimension D1 in the center part (the center axis CL11) of the valve seat 115a of the annular protruding portion 115 is in a range of 0.6 to 1.2, and the clearance dimension C2 of the second passage narrowing portion 18 in the radial direction of the second annular ridge 146 is preferably set such that a value of multiplying the clearance dimension C2 by the diametric dimension D1 in the center part (the center axis CL11) of the valve seat 115a of the annular protruding portion 115 is in a range of 0.6 to 1.2. For example, when the clearance dimension C2 is increased such that the value of multiplying the clearance dimension C2 by the diametric dimension D1 in the center part (the center axis CL11) of the valve seat 115a of the annular protruding portion 115 is out of the range of 0.6 to 1.2, as shown in FIG. 6, the measurement point A11 in the first space and the measurement point A12 in the second space are each under the negative pressure state. The pressure values at the measurement point A11 and the measurement point A12 go below P11 as shown in FIG. 8 (Increase C2), thus there is a possibility of generating the cavitation.

Figure 12:
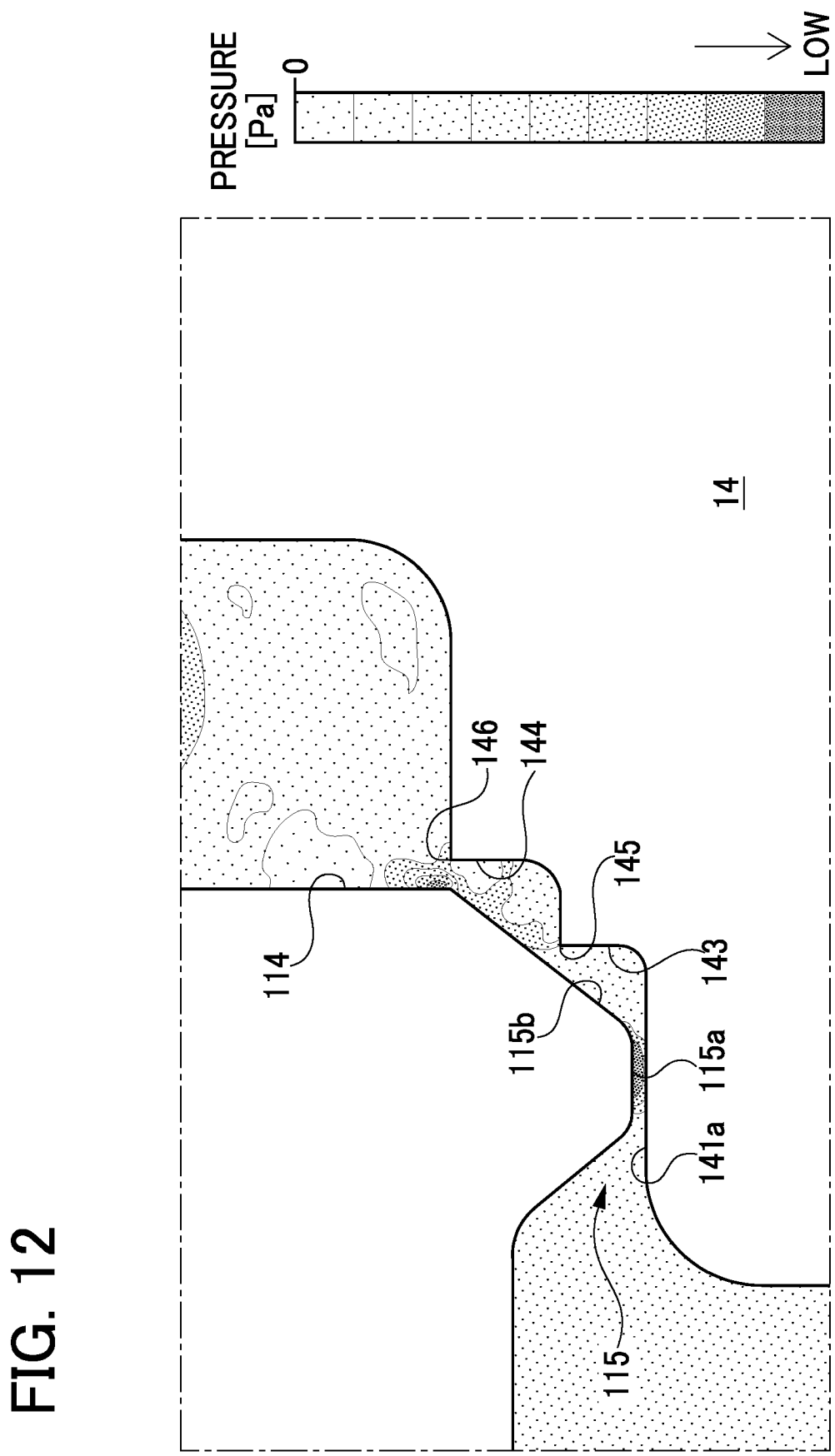
FIG. 12 is a pressure distribution diagram of the control fluid in the valve seat and its vicinity in a first modified example of the regulator in the present embodiment.

As a regulator according to a first modified example shown in FIG. 12, the valve body 11 may be configured such that no annular recessed portion 117 is provided on the annular diameter-decreasing surface 115b. In this example, the second space falls in the negative pressure state, but the first space and the valve hole 114 and its vicinity are maintained at a pressure value to an extent that no cavitation is generated, and accordingly, the configuration has an effect of suppressing generation of the cavitation.

Figure 9:
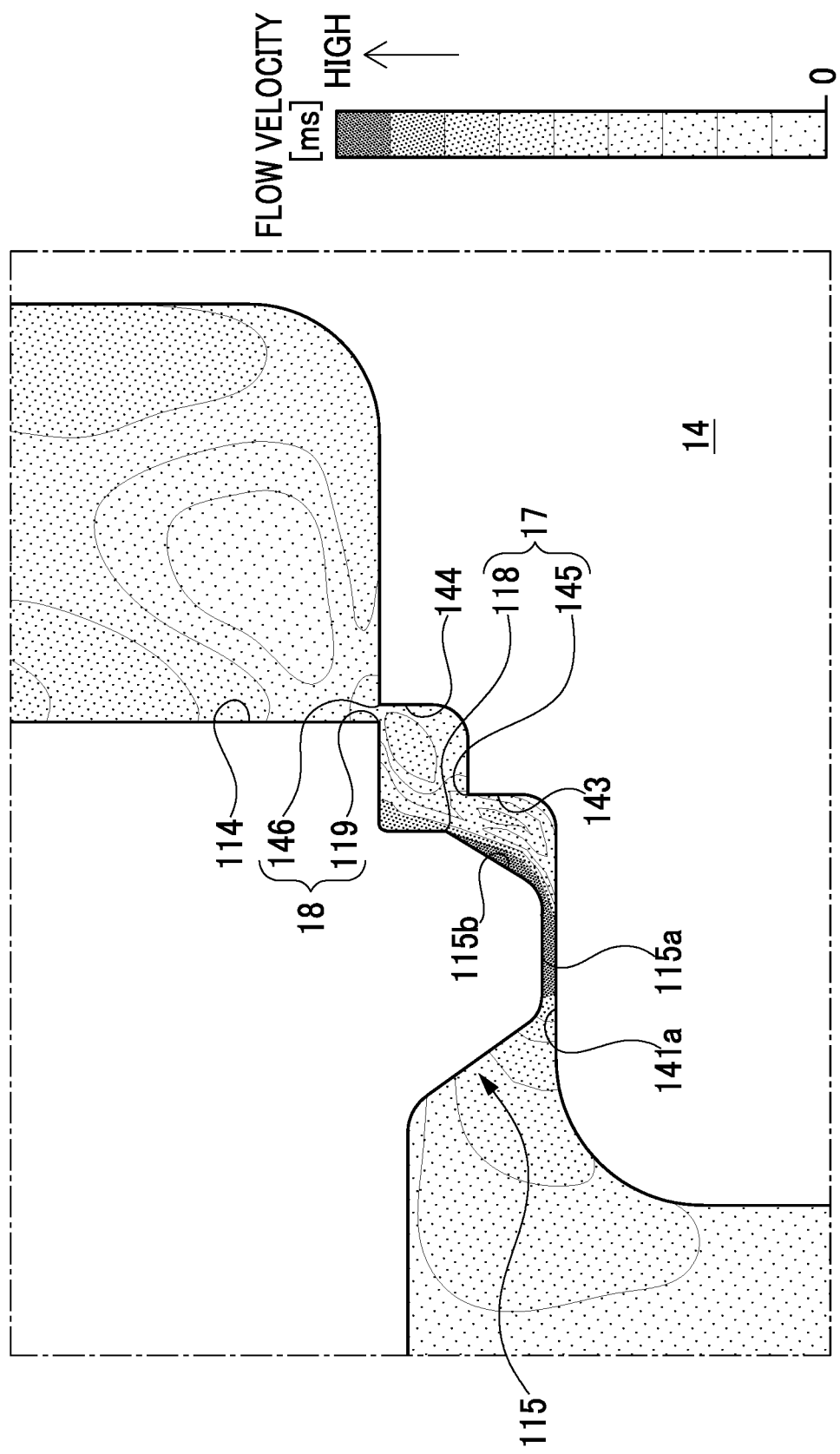
FIG. 9 is a flow velocity distribution diagram of the control fluid in the valve seat and its vicinity of the regulator in the present embodiment.
Figure 10:
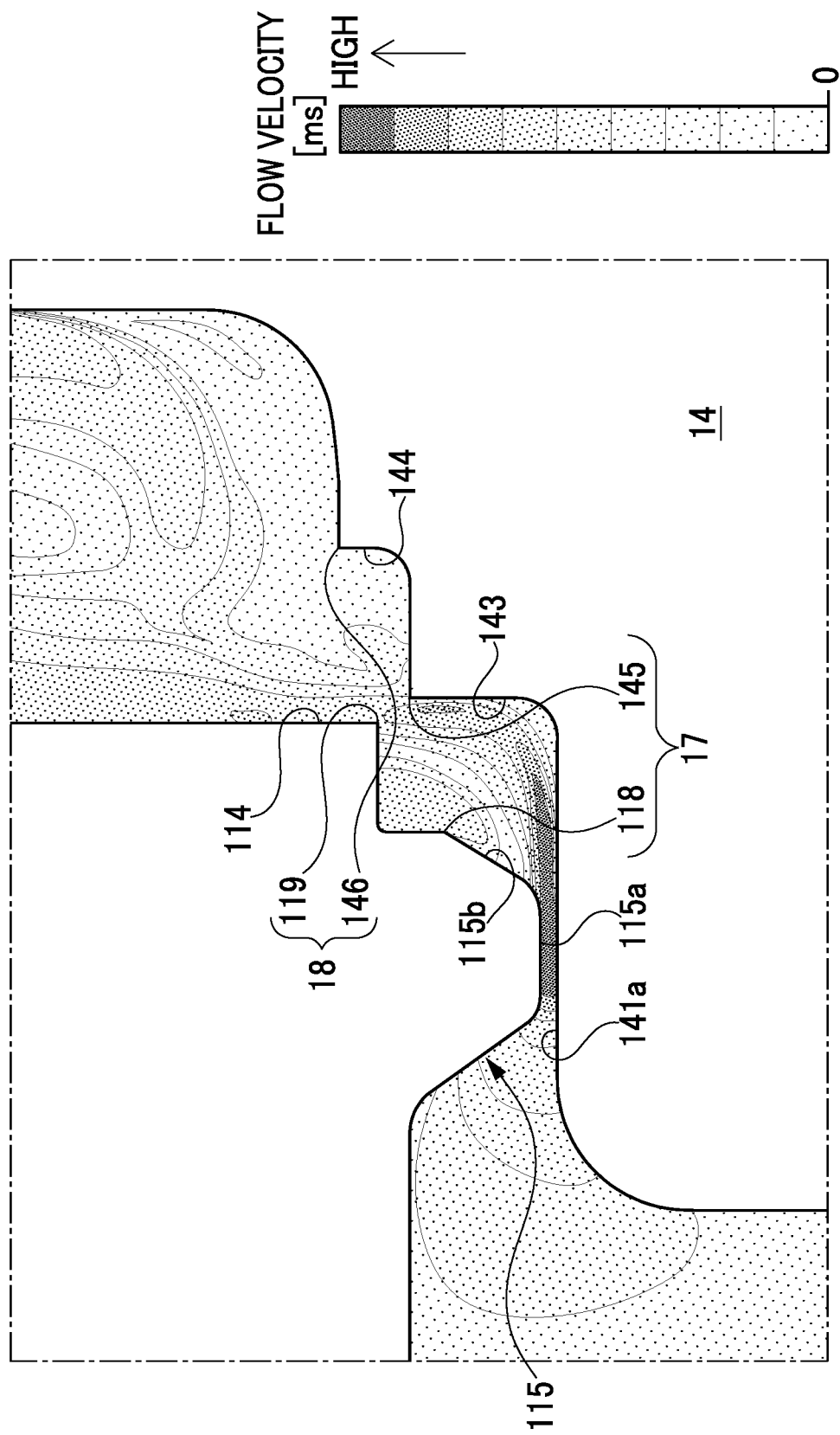
FIG. 10 is a flow velocity distribution diagram of the control fluid in the valve seat and its vicinity in a case when a distance between the valve seat and a step portion is increased.
Figure 11:
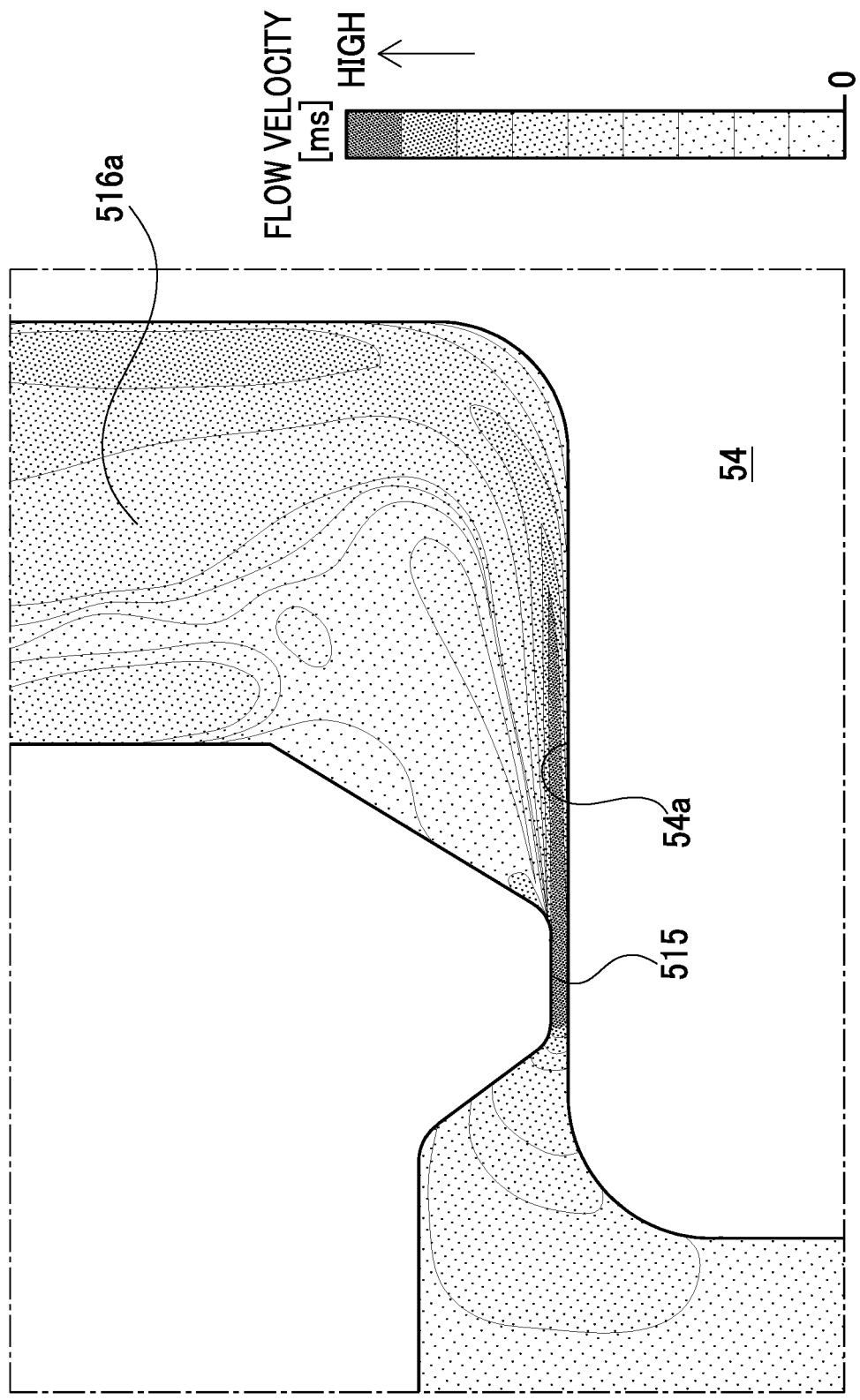
FIG. 11 is a flow velocity distribution diagram of the control fluid in the valve seat and its vicinity of the regulator in the conventional art.

Next, generation of the jet stream that has become a problem in the conventional art is explained with reference to FIGS. 9 to 11. FIG. 9 and FIG. 10 show distribution maps each illustrating flow velocity of the control fluid on the contact surface 141a, the valve seat 115a, and their vicinity when a pressure difference of the control fluid between the input side and the output side of the regulator 1 is controlled to be about 200 kPa for example, so that the valve open degree is made to be about 0.035 mm. The distribution maps represent computational analytical results of the flow velocity distribution by the Finite Element Method. FIG. 11 is a distribution map representing the flow velocity of the control fluid on the contact surface 54a, the valve seat 515, and their vicinity when the conventional regulator 50 has the open degree of 0.035 mm and representing the computational analytical results of the flow velocity distribution by the Finite Element Method. In each of the FIGS. 9 to 11, a part represented by dots with high density indicates a part where the control fluid has fast flow velocity, and a part represented by dots with low density indicates a part where the control fluid has low flow velocity.

From the analytical results of the conventional regulator 50 indicated in FIG. 11, a part having the high flow velocity of the control fluid extends along the contact surface 54a of the valve element 54. This demonstrates generation of the jet stream along the contact surface 54a. The jet stream generated along the contact surface 54a causes oscillation in the valve element 54.

On the other hand, in the regulator 1 according to the present embodiment, as shown in FIG. 9, a part with the high flow velocity of the control fluid extends from the clearance between the contact surface 141a and the valve seat 115a along the annular diameter-decreasing surface 115b, so that the jet stream having been generated along the contact surface 54a in the conventional regulator is resolved. This is because the step portion 143 guides the jet stream toward the valve hole 114 to separate the jet stream away from the valve element 14. This separation of the jet stream from the valve element 14 can suppress generation of the oscillation in the valve element 14 due to the jet stream.

Herein, as mentioned above, the distance d1 from the center part (the center axis CL11) of the valve seat 115a to the outer peripheral surface of the step portion 143 is preferably in the range of 0.4 mm to 0.8 mm, and the distance d2 from the outer peripheral surface of the step portion 143 to the outer peripheral surface of the second step portion 144 is preferably in the range of 0.4 mm to 0.8 mm. For example, in a case where the distance d1 is increased out of the range of 0.4 mm to 0.8 mm, as shown in FIG. 10, the part with high fluid velocity of the control fluid extends along the contact surface 141a of the valve element 14, and thus the jet stream fails to be separated away from the valve element 14. In this state, there is a possibility that generation of the oscillation in the valve element 14 due to the jet stream cannot be prevented.

Figure 13:
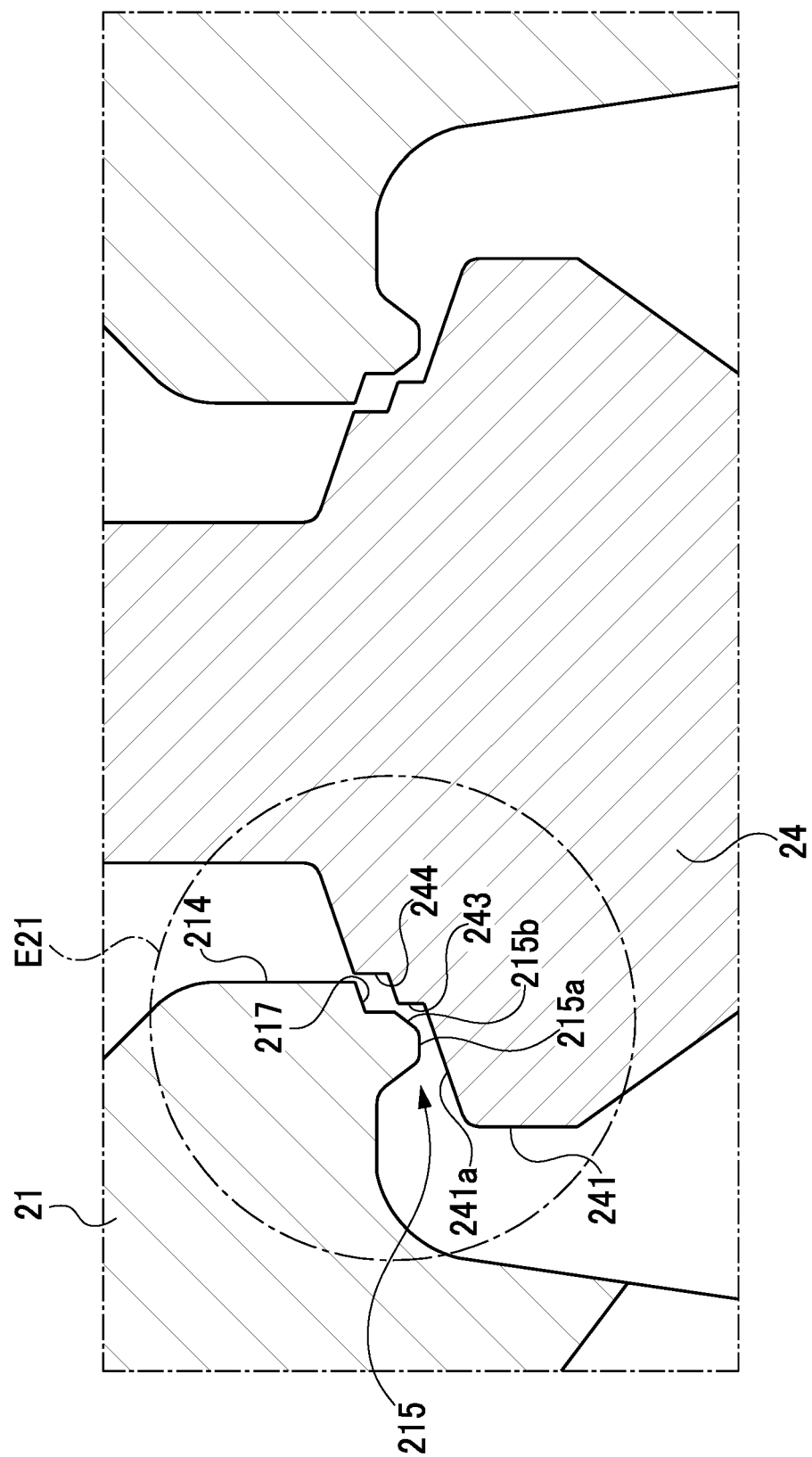
FIG. 13 is a partial enlarged view of the valve seat and its vicinity of the regulator in a second modified example of the present embodiment.
Figure 14:
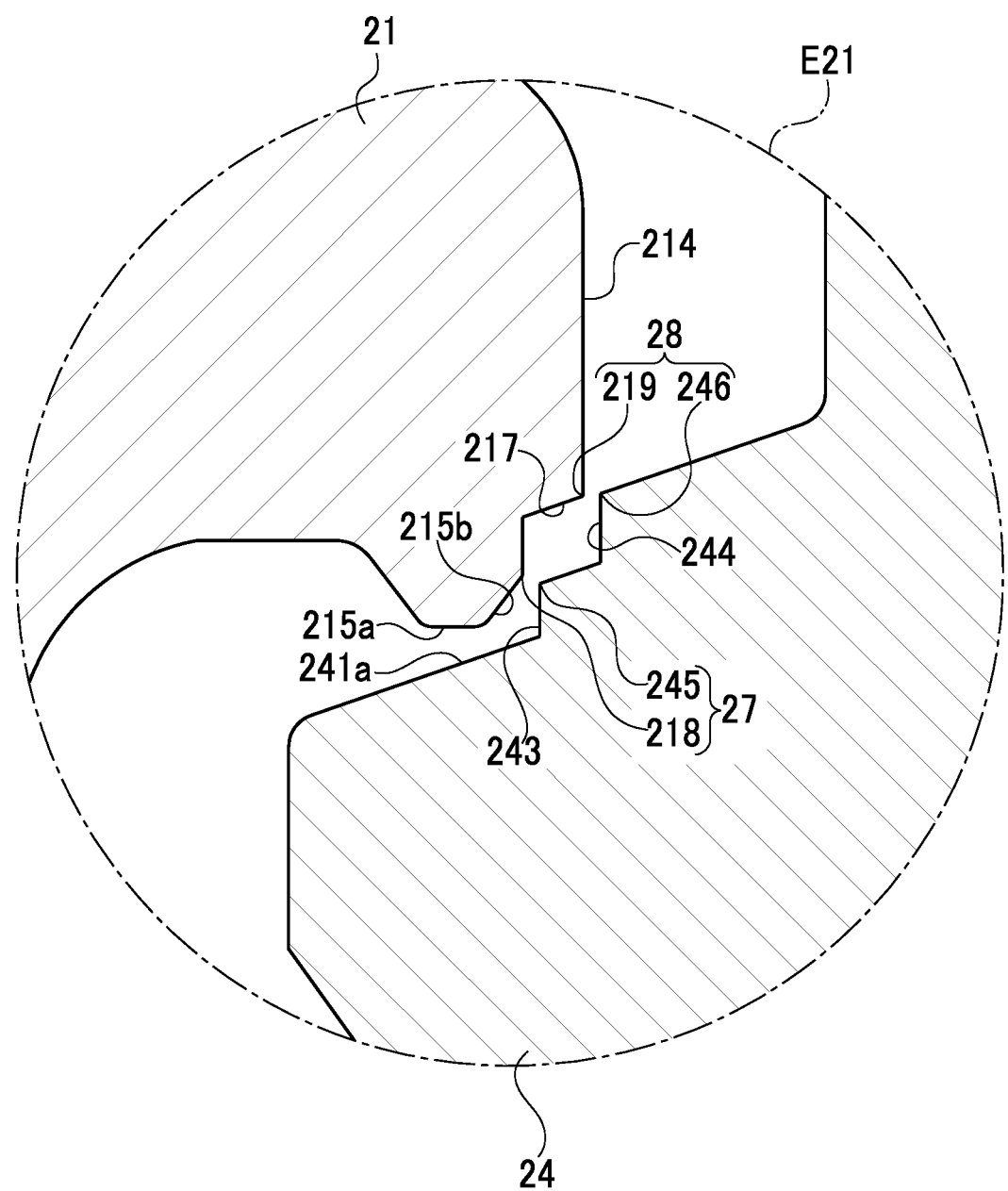
FIG. 14 is a partial enlarged view of a part E21 of FIG. 13.

In a second modified example of the present embodiment shown in FIGS. 13 and 14, a contact surface 241a is provided in a diameter-increased portion 241 of a valve element 24, which is to be in contact with a valve seat 215a provided on a leading end of an annular protruding portion 215 of a valve body 21, and this contact surface 214a may be inclined with respect to an axial center of the valve element 24. Further, an inner surface of an annular recessed portion 217 on a side of a valve hole 214 and each end face (an upper end face) of a step portion 243 and a second step portion 244 on a side of the valve hole 214 may also be inclined.

In this example, in a vicinity of a first annular ridge 245 (one example of an annular ridge) where an outer peripheral surface of the step portion 243 intersects the upper end face of the step portion 243, there is placed a third annular ridge 218 where an inner peripheral surface of the annular recessed portion 217 intersects the annular diameter-decreasing surface 215b, and the first annular ridge 245 and the third annular ridge 218 constitute a passage narrowing portion 27. Further, in a vicinity of the second annular ridge 246 where an outer peripheral surface of the second step portion 244 intersects an upper end face of the second step portion 244, there is placed a fourth annular ridge 219 where the inner surface of the annular recessed portion 217 on a side of the valve hole 214 intersects an inner peripheral surface of the valve hole 214, and the second annular ridge 246 and the fourth annular ridge 219 constitute a second passage narrowing portion 28.

Figure 15:
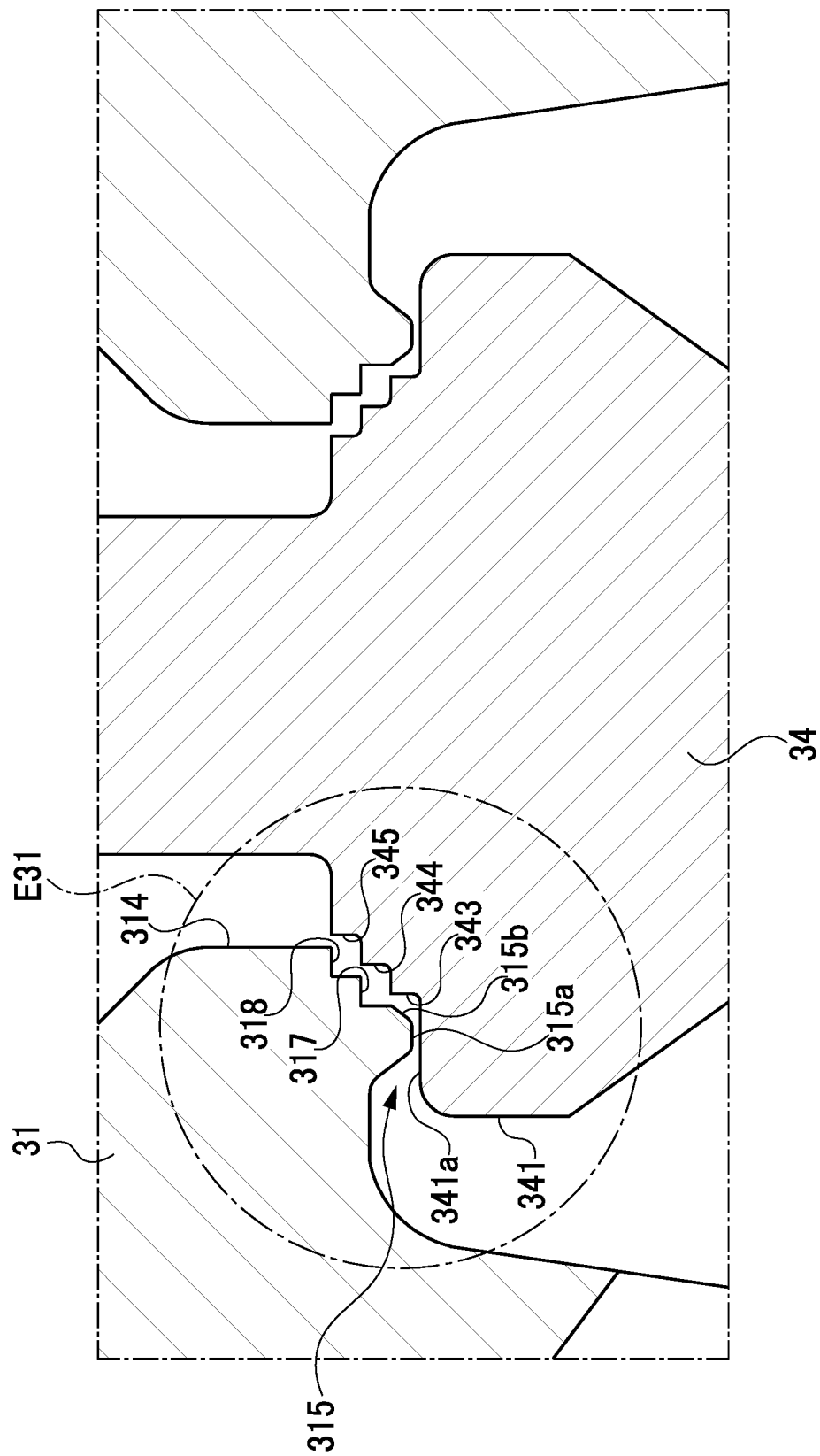
FIG. 15 is a partial enlarged view of the valve seat and its vicinity of the regulator in a third modified example of the present embodiment.
Figure 16:
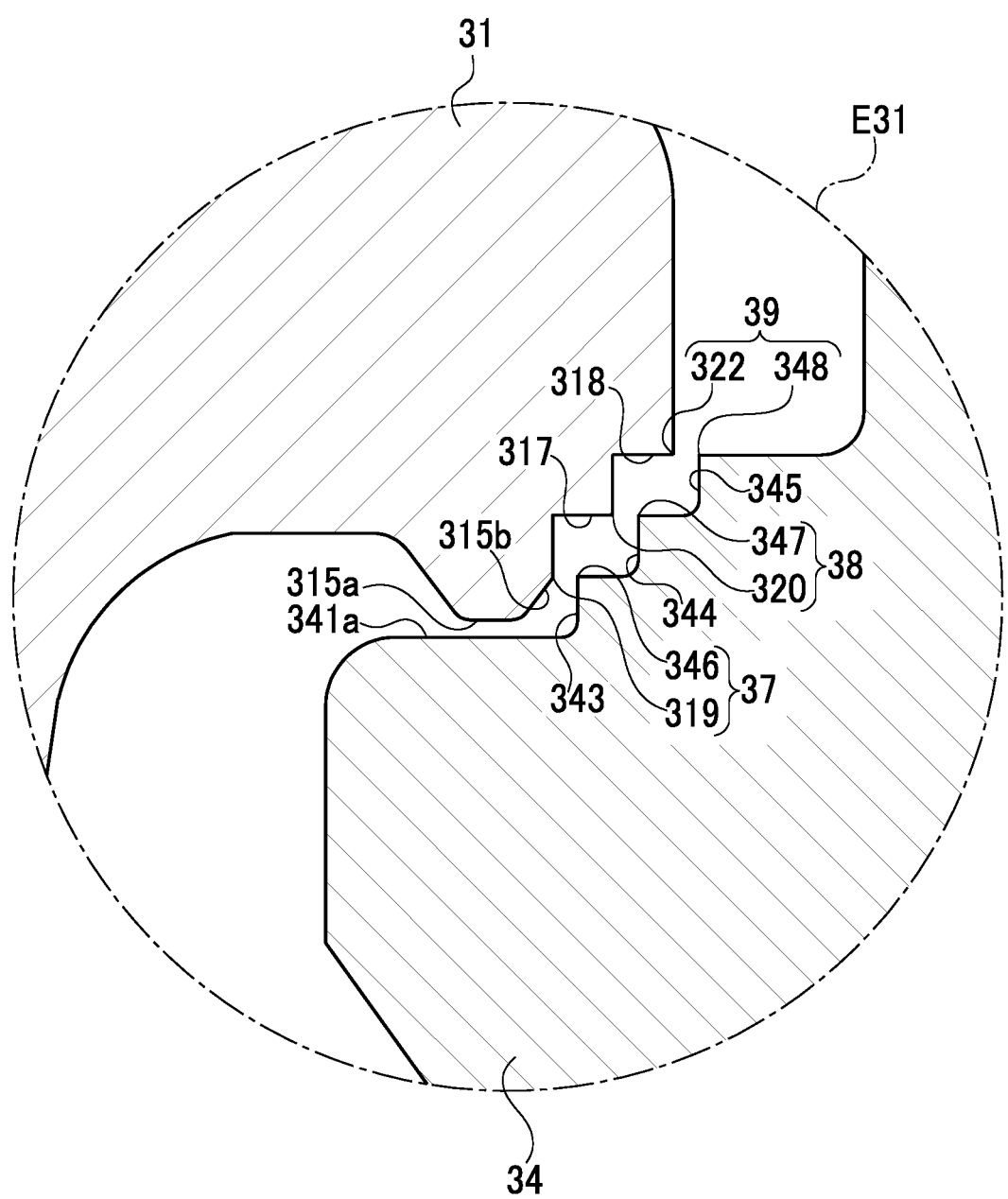
FIG. 16 is a partial enlarged view of a part E31 of FIG. 15.

Further, as a third modified example shown in FIGS. 15 and 16, a third step portion 345 and a second annular recessed portion 318 may be provided to constitute a third passage narrowing portion 39.

A valve body 31 is firstly explained. The valve body 31 includes an annular protruding portion 315 having a valve seat 315a on its leading end, and further includes an annular diameter-decreasing surface 315b and an annular recessed portion 317 as similar to the above-mentioned first embodiment. The valve body 31 is provided with the second annular recessed portion 318 formed in a drilled manner from an inner surface of the annular recessed portion 317 on a side of the valve hole 314.

Next, a valve element 34 is explained. The valve element 34 includes a diameter-increased portion 341 which is provided with a contact surface 341a to be in contact with a valve seat 315a and provided with a step portion 343 protruding from the contact surface 341a toward the valve hole 314 and a second step portion 344 protruding from an end face (an upper end face) of the step portion 343 on the side of the valve hole 314 toward the valve hole 314 as similar to the above-mentioned first embodiment, A third step portion 345 is formed to protrude from an end face (an upper end face) of the second step portion 344 on the side of the valve hole 314 toward the valve hole 314. The third step portion 345 has a diameter smaller than the second step portion 344 and is placed coaxially with the valve hole 314.

In this configuration, in a vicinity of a first annular ridge 346 (one example of an annular ridge) where an outer peripheral surface of the step portion 343 intersects the upper end face of the step portion 343, there is placed a third annular ridge 319 formed by intersecting an inner peripheral surface of the annular recessed portion 317 with the annular diameter-decreasing surface 315b, and the first annular ridge 346 and the third annular ridge 319 constitute a passage narrowing portion 37. Further, in a vicinity of the second annular ridge 347 where an outer peripheral surface of the second step portion 344 intersects the upper end face of the second step portion 344, there is placed a fourth annular ridge 320 where an inner surface of the annular recessed portion 317 on the side of the valve hole 314 intersects an inner peripheral surface of the second annular recessed portion 318, and the second annular ridge 347 and the fourth annular ridge 320 constitute a second passage narrowing portion 38. Furthermore, in a vicinity of a fifth annular ridge 348 where an outer peripheral surface of the third step portion 345 intersects an end face of the third step portion 345 on a side of the valve hole 314, there is placed a sixth annular ridge 322 where an inner surface of the second annular recessed portion 318 on the side of the valve hole 314 intersects the inner peripheral surface of the valve hole 314, and the fifth annular ridge 348 and the sixth annular ridge 322 constitute a third passage narrowing portion 39.

As mentioned above, according to the regulator 1 of the present embodiment, (1) the regulator 1 is configured to comprise: a valve element 14; a valve chamber 113 on an upstream side accommodating the valve element 14; a valve hole 114 on a downstream side communicated with the valve chamber 113; and an annular protruding portion 115 protruding from an inner surface of the valve chamber 113 on a side of the valve hole 114 along an outer periphery of the valve hole 114, the annular protruding portion 115 having a leading end provided with a valve seat 115a, the regulator 1 being configured to perform fluid control by bringing the valve element 14 into and out of contact with the valve seat 115a, wherein the annular protruding portion 115 is provided on its entire circumference on an inner diameter side with an annular diameter-decreasing surface 115b decreasing an inner diameter of the annular protruding portion 115 toward the valve hole 114, the valve element 14 includes a contact surface 141a to be in contact with the valve seat 115 and a columnar step portion 143 provided coaxially with the valve hole 114 with a large diameter larger than an inner diameter of the valve hole 114, the step portion 143 protruding from the contact surface 141a toward the valve hole 114 on an inner peripheral side of the valve seat 115a, and a first annular ridge 145 formed by intersecting an outer peripheral surface of the step portion 143 with an end face of the step portion 143 on a side of the valve hole 114 is placed in a vicinity of the annular diameter-decreasing surface 115b to form a passage narrowing portion 17.

According to the regulator 1 in the above-mentioned (1), a fluid flowing from the valve chamber 113 to the valve hole 114 passes through a portion narrowed its passage area by the valve element 14 and the valve seat 115a, a portion widened its passage area by a space (first space) surrounded by the annular diameter-decreasing surface 115b, the contact surface 141a, and the outer peripheral surface of the step portion 143, and a portion narrowed its passage area by the passage narrowing portion 17 in this order. Thus, the applicant has confirmed from experiments that a negative pressure state on the downstream side of the valve seat 115a is relaxed.

Relaxation of the negative pressure state can suppress generation of the cavitation, and even if the cavitation occurs, a term from generation to disappearance of the foam can be shortened. Accordingly, it is possible to suppress generation of the oscillation caused by the cavitation, thereby suppressing noises caused by the oscillation.

Further, the step portion 143 protruding from the contact surface 141a toward the valve hole 114 guides the jet stream toward the valve hole 114, so that the jet stream is separated away from the valve element 14. This can achieve suppression of the oscillation in the valve element caused by the jet stream, thereby achieving suppression of the noises.

(2) In the regulator 1 described in the above (1), the passage narrowing portion 17 is configured such that a value of multiplying a clearance dimension C1 in a radial direction of the first annular ridge 145 by a diametric dimension D1 of the center part (the center axis CL11) of the valve seat 115a of the annular protruding portion 115 is in a range of 0.6 to 1.2.

According to the regulator 1 in the above (2), the applicant has confirmed by experiments that the regulator 1 can achieve better effect of suppressing the oscillation caused by the cavitation.

(3) In the regulator 1 described in the above (1) or (2), a distance from the center part (the center axis CL) of the valve seat 115a to the outer peripheral surface of the step portion 143 is in a range from 0.4 mm to 0.8 mm.

According to the regulator 1 in the above (3), the applicant has confirmed by experiments that the regulator 1 can achieve better effect of suppressing the oscillation caused by the jet stream.

(4) In the regulator 1 described in any one of the above (1) to (3), the valve element 14 includes a columnar second step portion 144 provided coaxially with the valve hole 114, the second step portion 144 protruding from an end face of the step portion 143 on a side of the valve hole 114 toward the valve hole 114 with a diameter smaller than the outer diameter of the step portion 143, and a second annular ridge 146 formed by intersecting an outer peripheral surface of the second step portion 144 with an end face of the second step portion 144 on the side of the valve hole 114 is placed in a vicinity of an inner surface of the valve hole 114 to form a second passage narrowing portion 18.

According to the regulator 1 described in the above (4), the control fluid flowing from the valve chamber 113 to the valve hole 114 passes through a portion narrowed its passage area by the valve element 14 and the valve seat 115a, a portion widened its passage area by a space (a first space) surrounded by the annular diameter-decreasing surface 115b, the contact surface 141a, and the outer peripheral surface of the step portion 143, and a portion narrowed its passage area by the passage narrowing portion 17. Thereafter, the control fluid passes further through a portion widened its passage area by the end face of the step portion 143 on a side of the valve hole 114 and the outer peripheral surface of the second step portion 144 and a portion narrowed its passage area by the second passage narrowing portion 18 in this order. Accordingly, the applicant has confirmed by experiments that the negative pressure state on the downstream side of the valve seat 115a is further relaxed.

This relaxation in the negative pressure state can suppress generation of the cavitation. Suppression of the cavitation further suppresses the oscillation caused by the cavitation, and thus it is possible to prevent generation of noises due to the oscillation.

(5) In the regulator 1 described in the above (4), the second passage narrowing portion 18 is configured such that a value of multiplying a clearance dimension C2 in a radial direction of the second annular ridge 146 by the diametric dimension D1 of the center part (the central axis CL) of the valve seat 115a of the annular protruding portion 115 is in a range of 0.6 to 1.2.

According to the regulator described in the above (5), the applicant has confirmed by experiments that the fluid control valve can achieve better effect of suppressing the oscillation caused by the cavitation.

(6) In the regulator 1 described in the above (4) or (5), the annular diameter-decreasing surface 115b and an inner peripheral surface of the valve hole 114 are connected via an annular recessed portion 117 provided coaxially with the valve hole 114 and formed in a drilled manner from the annular diameter-decreasing surface 115b toward the valve hole 114, a third annular ridge 118 formed by intersecting the inner peripheral surface of the annular recessed portion 117 with the annular diameter-decreasing surface 115b is placed in a vicinity of the first annular ridge 145 to form the passage narrowing portion 17 with the first annular ridge 145, and a fourth annular ridge 119 formed by an inner surface of the annular recessed portion 117 on a side of the valve hole 114 intersecting the inner peripheral surface of the valve hole 114 is placed in a vicinity of the second annular ridge 146 to form the second passage narrowing portion 18 with the second annular ridge 146.

According to the regulator 1 described in the above (6), the applicant has confirmed by experiments that the annular recessed portion 117 widens a space (a second space) between the passage narrowing portion 117 and the second passage narrowing portion 18 to suppress the oscillation caused by the cavitation, thus achieving enhanced performance in the regulator 1.

(7) In the regulator 1 in the above (6), a distance from the center part (the central axis CL11) of the valve seat 115a to the inner surface of the annular recessed portion 117 on the side of the valve hole 114 is smaller than a distance from the contact surface 141a to an end face of the second step portion 144 on the side of the valve hole 114 by 0.03 mm to 0.13 mm.

According to the regulator 1 described in the above (7), even at a valve open degree (for example, about 0.035 mm) having a tendency of generating the negative pressure region on the downstream side of the valve seat 115a, the fourth annular ridge 119 is assuredly positioned in the vicinity of the second annular ridge 146 to form the second passage narrowing portion 18, so that the regulator 1 can achieve better effect of suppressing the oscillation caused by the cavitation.

(8) In the regulator 1 in any one of the above (4) to (7), a distance from the outer peripheral surface of the step portion 143 to an outer peripheral surface of the second step portion 144 is in a range from 0.4 mm to 0.8 mm.

According to the regulator 1 described in the above (8), the applicant has confirmed by experiments that the jet stream is assuredly introduced to the valve hole 114, so that the regulator 1 can achieve better effect of suppressing the oscillation of the valve element 14 caused by the jet stream.

(9) In the regulator 1 described in any one of the above (1) to (8), the regulator 1 comprises: a valve body 11 provided inside with the valve chamber 113 and the valve hole 114; an upper cover 12 overlapped above the valve body 11 in a direction parallel to a contact and separation direction of the valve element 14; and a diaphragm member 15 connected in its center portion 151 with the valve element 14 and provided with a diaphragm part 152 which is elastically deformed during contact and separation operation of the valve element 14 on an outer periphery of the center portion 151, wherein the valve body 11 has an opening portion 116 attached with the diaphragm member 15 on a side of the upper cover 12, the diaphragm member 15 is provided with an annular fixing portion 153 along an outer periphery of the diaphragm part 152, the diaphragm member 15 attached to the opening portion 116 by press-fitting the annular fixing portion 153 into the opening portion 116 is fixed in a manner that the annular fixing portion 153 is held by the upper cover 12 and the valve body 11 from both sides in the contact and separation direction, and the annular fixing portion 153 is provided with an annular cutout portion 153c formed by cutting out an entire outer circumference from the outer peripheral surface to an end face on a side of the valve body 11 except an end portion on the side of the upper cover 12.

According to the regulator 1 described in the above (9), the annular fixing portion 153 held by the upper cover 12 and the valve body 11 from both sides in a contact and separation direction is provided with the annular cutout portion 153c formed by cutting a part from the outer peripheral surface to the end face on the side of the valve body 11 of the annular fixing portion 153 except the end portion on the side of the upper cover 12 along the entire outer circumference of the annular fixing portion 153, and thus the upper end face 153b of the annular fixing portion 153 on the side of the upper cover 12 can assure an area wide enough to be pressed against the upper cover 12. The annular fixing portion 153 can thus have the area wide enough to be pressed against the upper cover 12, thus achieving assured fixation of the diaphragm member 15, so that the oscillation generated in the valve element 14 connected to the diaphragm member 15 can be suppressed. Further, the annular fixing portion 153 is cut out by the annular cutout portion 153c, and thus the valve body 11 can have enough thickness, thereby enhancing strength of the valve body 11.

The above-mentioned embodiments are only illustration and give no limitation to the present disclosure. Therefore, the present disclosure can be made with various improvements and modifications without departing from the scope of the disclosure.

For example, in the present embodiment, the first annular ridge 145, the second annular ridge 146, the third annular ridge 118, and the fourth annular ridge 119 are each of an edge-like shape, but alternatively, each of these ridges may be beveled to be a curved surface or a C-shaped curved surface.

REFERENCE SIGNS LIST

1 Regulator (one example of fluid control valve)
14 Valve element
17 Passage narrowing portion
113 Valve chamber
114 Valve hole
115 Annular protruding portion
115a Valve seat
115b Annular diameter-decreasing surface
143 Step portion
145 First annular ridge (one example of annular ridge)

What is claimed is:

1. A fluid control valve comprising:
a valve element;
a valve chamber on an upstream side accommodating the valve element;
a valve hole on a downstream side communicated with the valve chamber; and
an annular protruding portion protruding from an inner surface of the valve chamber on a side of the valve hole along an outer periphery of the valve hole, the annular protruding portion having a leading end provided with a valve seat, the fluid control valve being configured to perform fluid control by bringing the valve element into and out of contact with the valve seat, wherein
the annular protruding portion is provided on its entire circumference on an inner diameter side with an annular diameter-decreasing surface decreasing an inner diameter of the annular protruding portion toward the valve hole,
the valve element includes a contact surface to be in contact with the valve seat and a columnar step portion provided coaxially with the valve hole with a large diameter larger than an inner diameter of the valve hole, the step portion protruding from the contact surface toward the valve hole on an inner peripheral side of the valve seat,
an annular ridge formed by intersecting an outer peripheral surface of the step portion with an end face of the step portion on a side of the valve hole is placed in a vicinity of the annular diameter-decreasing surface to form a passage narrowing portion,
the valve element includes a columnar second step portion provided coaxially with the valve hole, the second step portion protruding from an end face of the step portion on a side of the valve hole toward the valve hole with a diameter smaller than the outer diameter of the step portion, and
a second annular ridge formed by intersecting an outer peripheral surface of the second step portion with an end face of the second step portion on the side of the valve hole is placed in a vicinity of an inner surface of the valve hole to form a second passage narrowing portion.

2. The fluid control valve according to claim 1, wherein the passage narrowing portion is configured such that a value of multiplying a clearance dimension in a radial direction of the annular ridge by a diametric dimension of a center part of the valve seat of the annular protruding portion is in a range of 0.6 to 1.2.

3. The fluid control valve according to claim 2, wherein a distance from the center part of the valve seat to the outer peripheral surface of the step portion is in a range from 0.4 mm to 0.8 mm.

4. The fluid control valve according to claim 1, wherein a distance from a center part of the valve seat to the outer peripheral surface of the step portion is in a range from 0.4 mm to 0.8 mm.

5. The fluid control valve according to claim 1, wherein the second passage narrowing portion is configured such that a value of multiplying a clearance dimension in a radial direction of the second annular ridge by the diametric dimension of a center part of the valve seat of the annular protruding portion is in a range of 0.6 to 1.2.

6. The fluid control valve according to claim 1, wherein
the annular diameter-decreasing surface and an inner peripheral surface of the valve hole are connected via an annular recessed portion provided coaxially with the valve hole and formed in a drilled manner from the annular diameter-decreasing surface toward the valve hole,
a third annular ridge formed by intersecting the inner peripheral surface of the annular recessed portion with the annular diameter-decreasing surface is placed in a vicinity of the annular ridge to form the passage narrowing portion with the annular ridge, and
a fourth annular ridge formed by an inner surface of the annular recessed portion on a side of the valve hole intersecting the inner peripheral surface of the valve hole is placed in a vicinity of the second annular ridge to form the second passage narrowing portion with the second annular ridge.

7. The fluid control valve according to claim 6, wherein a distance from the valve seat to the inner surface of the annular recessed portion on the side of the valve hole is smaller than a distance from the contact surface to an end face of the second step portion on the side of the valve hole by 0.03 mm to 0.13 mm.

8. The fluid control valve according to claim 1, wherein a distance from the outer peripheral surface of the step portion to an outer peripheral surface of the second step portion is in a range from 0.4 mm to 0.8 mm.

9. The fluid control valve according to claim 1, wherein the fluid control valve comprises:
a valve body provided inside with the valve chamber and the valve hole;
a cover member overlapped above the valve body in a direction parallel to a contact and separation direction of the valve element; and
a diaphragm member connected in its center portion with the valve element and provided with a diaphragm part which is elastically deformed during contact and separation operation of the valve element on an outer periphery of the center portion, wherein,
the valve body has an opening portion attached with the diaphragm member on a side of the cover member,
the diaphragm member is provided with an annular fixing portion along an outer periphery of the diaphragm part,
the diaphragm member attached to the opening portion by press-fitting the annular fixing portion into the opening portion is fixed in a manner that the annular fixing portion is held by the cover member and the valve body from both sides in the contact and separation direction, and
the annular fixing portion is provided with an annular cutout portion formed by cutting out an entire outer circumference from the outer peripheral surface to an end face on a side of the valve body except an end portion on the side of the cover member.

\* \* \* \* \*